(12) United States Patent  (10) Patent No.: US 6,694,632 B1
Schooley                    (45) Date of Patent: Feb. 24, 2004

(54) LEVEL

(75) Inventor: Jack M. Schooley, P.O. Box 4873, Vancouver, WA (US) 98662

(73) Assignees: Jack M. Schooley, Vancouver, WA (US); Jason R. Crowe, Vancouver, WA (US)

(*) Notice: Subject to any disclaimer, the term of this patent is extended or adjusted under 35 U.S.C. 154(b) by 0 days.

(21) Appl. No.: 09/658,821

(22) Filed: Sep. 8, 2000

Related U.S. Application Data

(63) Continuation-in-part of application No. 09/302,014, filed on Apr. 29, 1999, now Pat. No. 6,293,023.

(51) Int. Cl.⁷ ................................................. G01C 9/28
(52) U.S. Cl. ........................... 33/374; 33/579; 33/376; 33/375; 33/809; 33/451
(58) Field of Search .......................... 33/374, 365, 375, 33/419, 425, 451–452, 464, 470, 809, 290–292, 296, 245, 380, 383, 579

(56) References Cited

U.S. PATENT DOCUMENTS

| 2,419,451 | A |   | 4/1947  | Keller |        |
|-----------|---|---|---------|--------|--------|
| 3,243,888 | A |   | 4/1966  | Redding |       |
| 3,984,919 | A |   | 10/1976 | Guisti |        |
| 4,067,117 | A | * | 1/1978  | Bernard | 33/375 |
| 4,130,943 | A |   | 12/1978 | Talbot |        |
| 4,152,838 | A |   | 5/1979  | Cook   |        |
| 4,419,833 | A | * | 12/1983 | Wright | 33/379 |
| 4,435,908 | A | * | 3/1984  | Semler, Jr. | 33/376 |
| 4,471,532 | A | * | 9/1984  | Francis | 33/296 |
| 4,607,437 | A |   | 8/1986  | McSorley, Sr. et al. | |
| 4,733,475 | A | * | 3/1988  | Youmans | 33/372 |
| 4,862,595 | A | * | 9/1989  | Drumright | 33/374 |
| 4,894,925 | A | * | 1/1990  | Langmaid | 33/374 |
| 4,910,876 | A | * | 3/1990  | Channell | 33/374 |
| 4,928,395 | A | * | 5/1990  | Good | 33/374 |
| 5,103,569 | A |   | 4/1992  | Leatherwood | |
| 5,249,365 | A |   | 10/1993 | Santiago | |
| 5,279,041 | A | * | 1/1994  | Wright | 33/379 |
| 5,412,875 | A |   | 5/1995  | Hilderbrandt | |
| 5,433,011 | A |   | 7/1995  | Scarborough et al. | |
| 5,442,864 | A | * | 8/1995  | Erman | 33/376 |
| 5,519,942 | A | * | 5/1996  | Webb | 33/290 |
| 5,577,327 | A | * | 11/1996 | Archambault | 33/374 |
| 5,617,641 | A | * | 4/1997  | Aarhus | 33/374 |
| 5,832,618 | A | * | 11/1998 | Scarborough | 33/451 |
| 6,041,510 | A |   | 3/2000  | Huff |        |
| 6,047,478 | A |   | 4/2000  | Sowers |        |
| 6,133,996 | A | * | 10/2000 | Plumb et al. | 356/138 |
| 6,282,805 | B1 | * | 9/2001 | Cosentino | 33/374 |
| 6,332,277 | B1 | * | 12/2001 | Owoc et al. | 33/373 |
| 2001/0030033 | A1 | * | 10/2001 | O'Donnell | 162/272 |
| 2001/0039305 | A1 | * | 11/2001 | Nakamura et al. | 524/100 |
| 2002/0121026 | A1 | * | 9/2002 | Pustay | 33/374 |
| 2003/0093909 | A1 | * | 5/2003 | Liao | 33/375 |

* cited by examiner

Primary Examiner—Gail Verbitsky
(74) Attorney, Agent, or Firm—Kolisch Hartwell, P.C.

(57) ABSTRACT

A level comprises a frame defining first and second parallel channels and first and second rails fitted slidingly in the first and second channels respectively. The level is adjustable in length by sliding the rails in the respective channels of the frame.

29 Claims, 4 Drawing Sheets

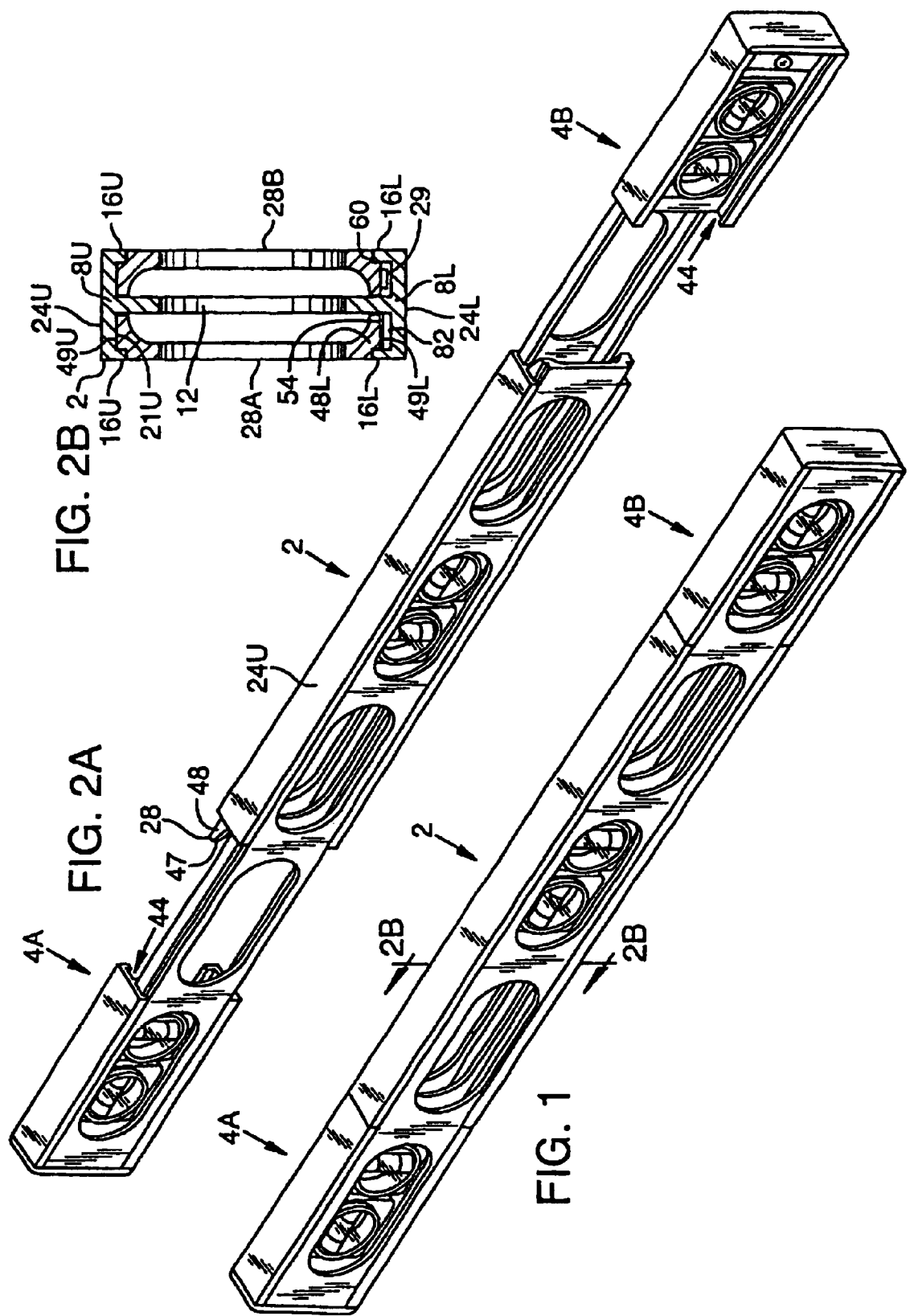

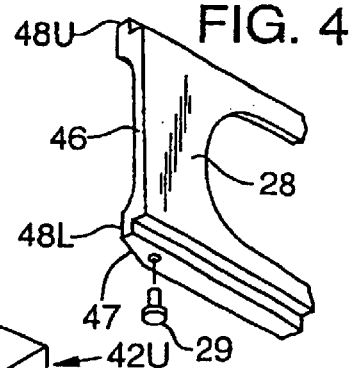
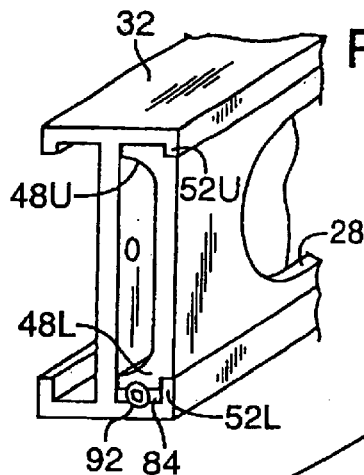
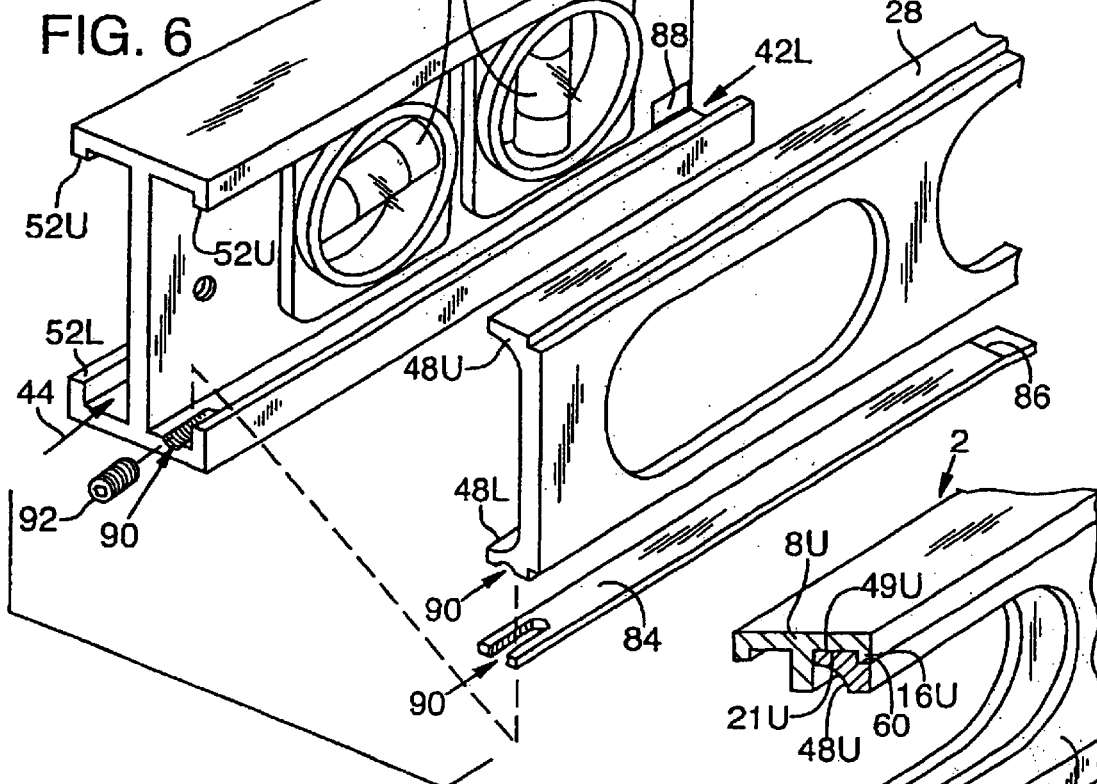
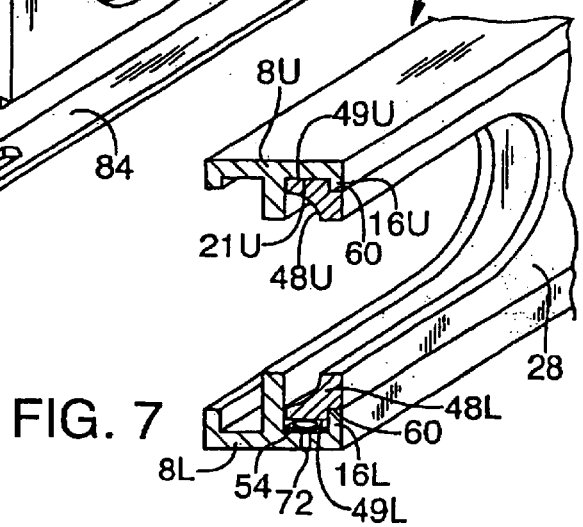

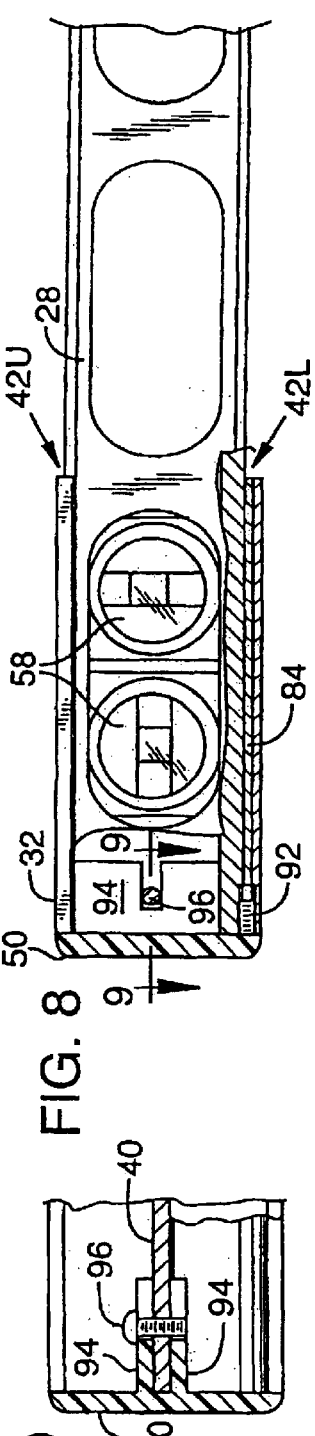
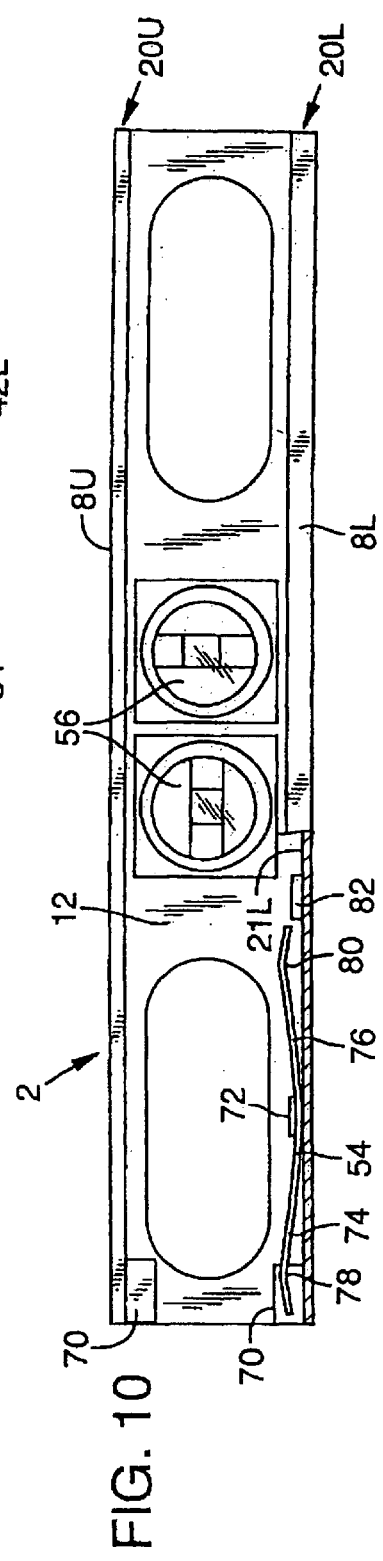
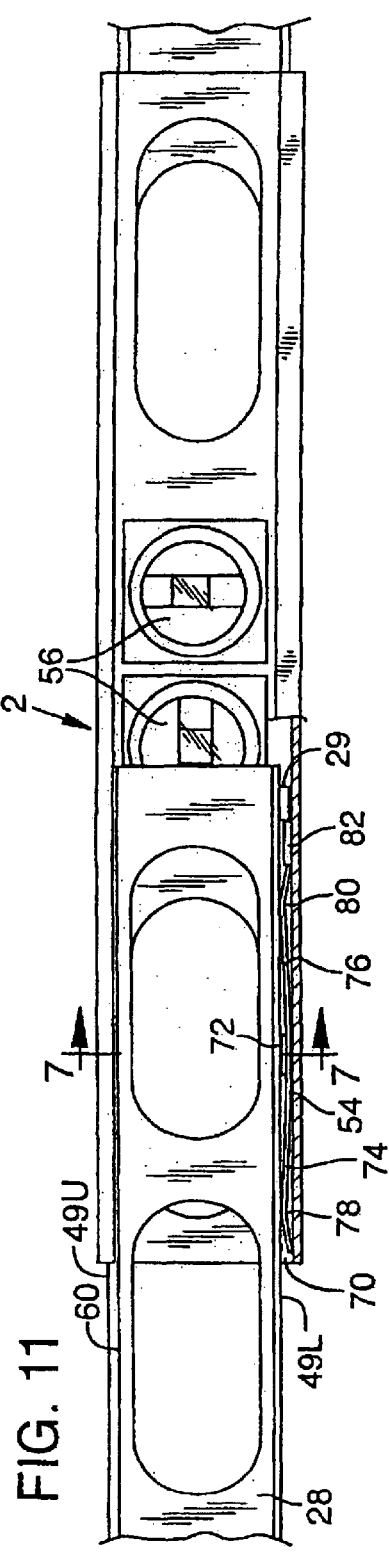

LEVEL

CROSS-REFERENCE TO RELATED APPLICATION(S)

This application is a continuation-in-part of applicant's patent application Ser. No. 09/302,014 filed Apr. 29, 1999 for "Level," now U.S. Pat. No. 6,293,023B1.

BACKGROUND AND SUMMARY OF THE INVENTION

This invention relates to a level.

The conventional carpenter's level, which is used for testing whether a nominally horizontal (or vertical) surface is in fact horizontal (or vertical), within an acceptable tolerance, comprises a frame, typically made of a metal such as aluminum alloy, having at least one flat guide surface and two bubble vials mounted in the frame. The level is positioned with the guide surface against the surface to be tested. One vial is oriented relative to the guide surface for testing a nominally vertical surface and the other is oriented for testing a nominally horizontal surface. The typical level is about 2 feet long, although longer levels, e.g. four feet or six feet long, are also available.

The fact that conventional levels are available only in increments of about 2 feet in length gives rise to difficulty or inconvenience in using the conventional level. Imagine, for example, that you are installing a shelf inside a closet having a back wall about 3'6" wide between two side walls. You wish to attach a support to the back wall for supporting the rear edge of the shelf The support should be horizontal, and you wish to mark the position of the support at two locations, adjacent the side walls respectively. Obviously, since the back wall is only 3'6" wide, you cannot use a four foot level because there is not sufficient space between the two side walls. If you attempt to use a 2 foot level, you must place the markings in two steps, which is inconvenient and can cause errors.

SUMMARY OF THE INVENTION

In accordance with the invention there is provided a level comprising a frame defining first and second parallel channels, and first and second rails fitted slidingly in the first and second channels respectively, whereby the level is adjustable in length by sliding the rails in the respective channels.

BRIEF DESCRIPTION OF THE DRAWINGS

For a better understanding of the invention, and to show how the same may be carried into effect, reference will now be made, by way of example, to the accompanying drawings, in which FIG. 1 is a perspective view of a level in accordance with the invention in a retracted condition, showing a central frame and first and second rails on each side of the frame, the frame and rails having flat, coplanar guide surfaces and indicators mounted in parallel and perpendicular relation to the coplanar guide surfaces.

FIG. 2A is a similar view of the level in a partially extended condition, showing the first and second rails slid outwardly relative to the central frame, each rail including a slide mounted within channels in the central frame, and each rail including a frame extender providing the flat, coplanar guide surface, and showing an end cap mounted at the outer end of each frame extender.

FIG. 2B is a cross-sectional view of the level of FIG. 1 showing an I-cross-section of the frame formed by a web plate, which includes racetrack-shaped cutouts, and guide members above and below the web plate, the guide members including outer flanges, and also showing the slides mounted in the set of channels defined by the frame, and a leaf spring in a lower left channel of the frame biasing one of the slides upward against an upper left sliding surface in a channel, and a stop mounted in a lower right channel of the frame.

FIG. 4 is a perspective view of the end of the slide opposite the frame extender, showing the narrowed portion of the slide to ease insertion of the slide into the frame channels during assembly.

FIG. 5 is a perspective view of the outer end of one of the rails with the end cap removed, showing the assembly of the slide, the frame extender, and a spacer, the parts being coupled together by an Allen bolt.

FIG. 6 is an exploded view of the rail assembly, showing a tapped holed formed longitudinally through the slide, frame extender, and spacer, and the Allen bolt for securing the parts together, the view also showing an angle formed in the end of the spacer opposite the tapped hole, the angle configured to bias the slide upwardly within the frame extender to aid in securing the slide in place.

FIG. 7 is a cross-sectional, perspective view of the level (cut from FIG. 11, described below) showing a rivet holding the leaf spring in place in the frame channel beneath the slide that is slidably mounted in the channel.

FIG. 8 is a side elevation of one of the rails of the level with a partial cutaway showing the position of the Allen bolt securing the slide, frame extender, and spacer, and showing a screw securing the end cap to the frame extender.

FIG. 9 is a cross-sectional view of the rail (cut from FIG. 8), showing the screw installed through the end cap and through the web plate of the frame extender.

FIG. 10 is a side elevation of the central frame with a partial cutaway showing the leaf spring mounted in one of the channels by a central rivet, the leaf spring including two wings extending left and right of the central rivet, each wing including a contact line defined between two non-coplanar portions, and showing the stop and two strips of polyethylene tape for biasing the slide against the outer flanges of the frame.

FIG. 11 is a side elevation, with a partial cutaway as in FIG. 10, showing the slide positioned within the channels of the frame to the extended condition, the slide compressing at its lower surface both wings of the leaf spring, and the leaf spring biasing the slide upwardly, and also showing the pin on the slide abutting the stop on the frame to prevent the slide from being moved beyond the extended position.

DETAILED DESCRIPTION

Figure 3:
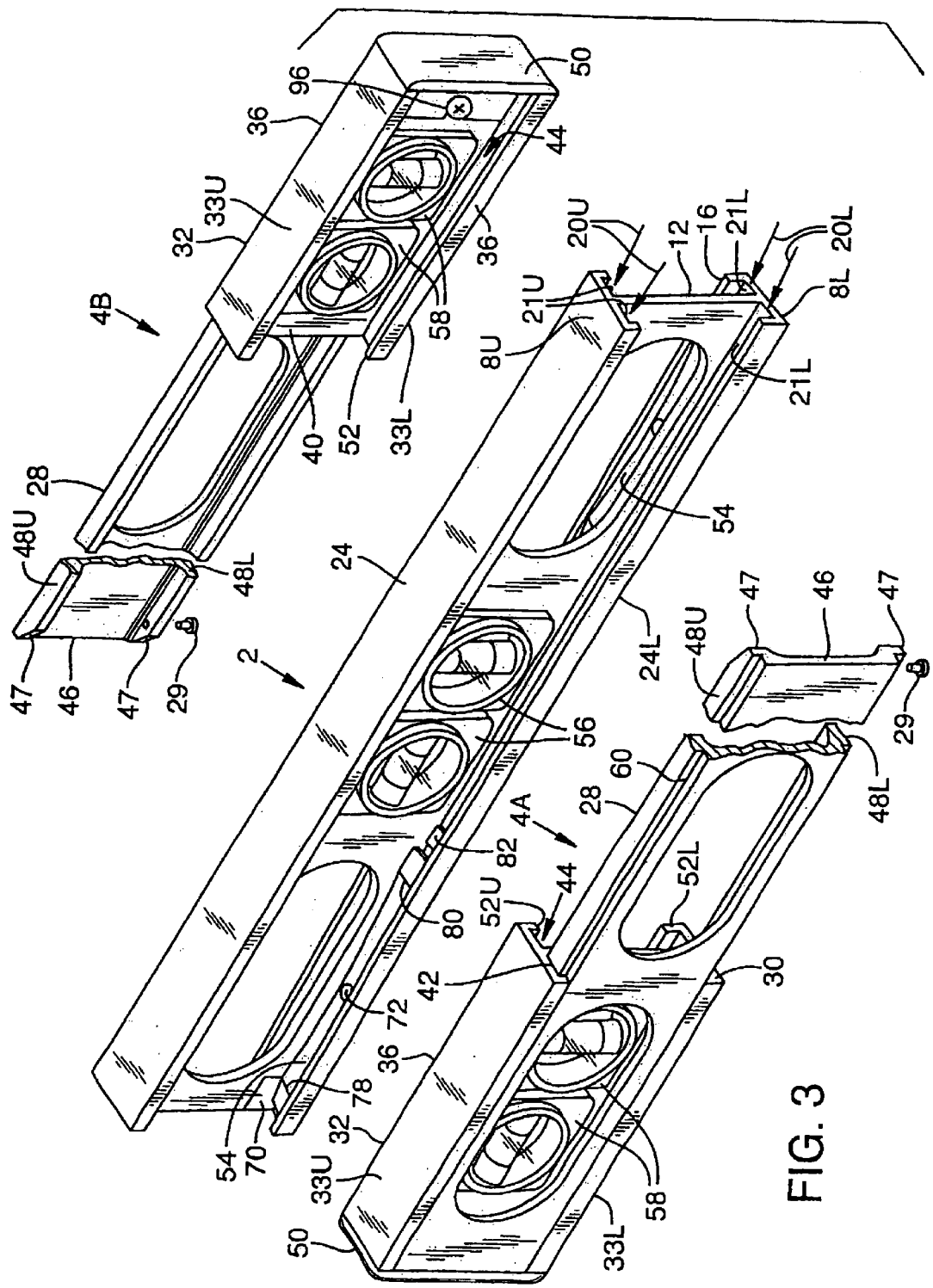
FIG. 3 is a perspective exploded view of the level showing the central frame with channels, one leaf spring riveted in each of the two lower channels, one stop, two indicators of the bubble vial variety, and two rails each including the slide and the frame extender and a pin mounted at an end of the slide opposite the frame extender for cooperative abutment with the stop to arrest sliding motion of the rail at the extended condition.

The illustrated level comprises a frame 2 and two rails 4A and 4B. In the following description, the suffix A or B is used when it is necessary or helpful to distinguish between the two rails or elements that are associated with the two rails. Otherwise, no suffix is used.

The frame 2 is preferably made from a length segment of an aluminum alloy extrusion, and can be formed of any metal, plastic or other material suitable for use as a level. Frame 2 is preferably generally I-shaped in cross-section, having two spaced parallel guide members 8U and 8L connected by a web plate 12 so that two pairs of upper and lower channels 20U and 20L are defined on opposite sides respectively of the web plate 12. Each member 8 has at each edge a lip or flange 16 projecting toward the other member 8. As best seen in FIG. 2B, upper flanges 16U are preferably shorter than lower flanges 16L. The frame has two parallel guide surfaces 24U and 24L. Within the two upper channels 20U, guide member 8U provides a pair of sliding surfaces 21U, on each side of web plate 12. It will be understood that the terms upper and lower are used for ease of reference to the drawings, and the invented level may generally be used in the same orientation as shown in the drawings, or inverted, and that the invention may generally be practiced with one or more components of the level disposed on either an upper or lower portion of the level with an appropriate reconfiguration of other components as necessary.

Each rail 4 includes a slide 28 and a frame extender 32 that is attached to the slide.

The frame extender 32 may be made of a length segment of the same extrusion as is used to make the frame 2 and consequently it includes two parallel guide members 36 and a web plate 40. Preferably, frame extender 32 is formed with a cross-section identical to the cross-section of frame 2. Frame extender 32 may be formed in a separate extrusion operation, or if formed in the same extrusion, cut to length in an operation separate from the cutting of frame 2. The guide members 36 and the web plate 40 define two channels 42, 44 on opposite sides respectively of the web plate 40. Each guide member 36 has at each edge a lip or flange 52 projecting toward the other guide member 36. As for frame 2, upper flanges 52U of frame extender 32 are preferably shorter than the lower lips. The frame extender has two parallel guide surfaces 33U and 33L.

Each slide 28 incudes a web plate 46 and two flanges 48 which extend perpendicular to the web plate 46. The slide has a rebate 60 at the base of each flange. The cross-sectional configuration of the slide is selected relative to that of the channels of the frame extender so that the slide 28 can be inserted in the channel 42 in only one orientation, and in this orientation the web plate 46 of the slide is held away from the web plate of the frame extender by the flanges 48. The slide 28 is retained in position relative to the frame extender by pins 29 . The slide does not obstruct the channel 44. Each rail also includes an end cap 50, which is attached to the frame extender and the slide.

Frame 2, frame extenders 32, and slides 28 are preferably formed from aluminum, or an aluminum alloy, as noted above. It will be appreciated by those skilled in the art that under some conditions aluminum does not slide smoothly against aluminum but sticks due to galling. Various treatments are available for relieving galling. The primary locations where sticking can present a problem are on the interfacing sliding surfaces of slides 28 and guide members 8U and 8L of frame 2.

As perhaps best seen in FIG. 7 and also shown in other figures, slide 28 includes upper flange 48U that has a sliding surface 49U extending across flange 48U, including rebate 60. Sliding surface 49U is in contact with, and slides along sliding surface 21U of guide member 8U of frame 2, including flange 16U. Lower flange 48L of slide 28 has a sliding surface 49L extending across flange 48L, including rebate 60. Flange 48L and sliding surface 49L are preferably substantially a mirror image of flange 48U and sliding surface 49U, although they may alternatively be formed in different configurations that are designed to be slidably mounted in frame 2.

Friction typically exists between sliding surface 21U of frame 2 and sliding surface 49U of slide 28, particularly in light of a biasing means, such as leaf spring 54, mounted in channel 20L of frame 2, which urges slide 28 upwardly toward guide member 8U and urges sliding surface 49U against sliding surface 21U. Leaf spring 54 is preferably made of stainless steel, and will be described in more detail below. Leaf spring 54 is in slidable, frictional contact with lower flange 48L of slide 28 at a portion of sliding surface 49L. The portion of sliding surface 49L within rebate 60 may also be in sliding, frictional contact with the inner side of lower flange 16L. To prevent sticking, it is desirable to treat one or both of each pair of contacting surfaces. Preferably, sliding surfaces 49U and 49L, including the portion within rebates 60, are treated by application of a coating, which preferably includes PTFE. The coating may include a blend of about 5% to about 7% of PTFE, preferably about 6% of PTFE, mixed with a binder, such as polyester, a polyester-epoxy hybrid, or most preferably epoxy. Such a blend, which can be formed using the PTFE product of the DuPont Corporation known as Polymist® (No. F-5AEX), is coated on sliding surfaces 49U and 49L of slide 28 and cured at about 390° F. Coating with the PTFE blend is preferable to coating with pure PTFE because the typical curing temperature for pure PTFE is about 1,000° F., which can adversely affect aluminum. Other treatments and coating for the sliding surfaces may be substituted, or combinations of materials with low mutual coefficients of friction may be used.

As best seen in FIGS. 3 and 7, slide 28 has a cross-section, including sliding surfaces 49U and 49L and rebates 60, designed to mate with, and slide within channels 20U and 20L, including flanges 16U and 16L. The dimensions of slide 28 are typically smaller than that of channels 20U and 20L. E.g., channels 20U and 20L may be about 0.350-inches wide between web plate 12 and flanges 16, while the width of flange 48, not including the rebate portion, is about 0.338-inches. A shim, such as strip of tape 70 can be installed in channel 20 to fit and position slide 28 in channel 20. Preferably, an ultra-high molecular weight (UHMW) tape, such as the polyethylene tape made by the 3M Corporation is used. Such tape has the characteristics useful in this application of providing a low coefficient of friction, abrasion resistance, and a degree of compressability so that slide 28 will be securely slidable within the channel despite ordinary manufacturing tolerances for the channel and slide. As seen in FIG. 10, a pair of strips of tape 70 are preferably installed on frame 2, one at each of the entrance points to channels 20U and 20L. Tape 70 and a narrowed portion 47 (FIGS. 3 and 4) of slide 28 facilitate insertion of slide 28 into channels 20 during assembly of the level.

The cross-sectional configuration of the slide 28 also allows the slide to be inserted in the channel 20 of the frame with the web plate 46 of the slide held away from the web plate 12 of the frame 2 by the flanges 48. The slide constrains the frame extender into alignment with the frame 2, with the two guide surfaces of the frame extender coplanar with the guide surfaces 24 of the frame. The slide 28 is slidable in the channel 20, allowing adjustment in the length of the level between a retracted condition, in which the frame extenders abut the frame 2, as shown in FIG. 1, through a partially extended condition, shown in FIG. 2, to a fully extended condition in which only a relatively short segment of the length of the slide is accommodated in the channel 20.

The length of each slide 28 is approximately equal to the sum of the length of the frame 2 and the lengths of the two frame extenders 32. The slide of the rail 4A then extends through one pair of upper and lower channels 20U, 20L of the frame 2 and into the channel 44 of the rail 4B when thy level is in the retracted condition. Likewise, the slide of rail 4B then extends through the pair of upper and lower channels 20U, 20L on the other side of web plate 12 and into the channel 44 of the rail 4A when the level is in the retracted condition. This allows the maximum difference in length between the retracted condition and the fully extended condition.

The frame also preferably includes, in each lower channel 20L, a leaf spring 54 Alternatively, two leaf springs can be mounted in each channel 20L, particularly with a longer level. The level is nominally about 2-feet long in the retracted condition and about 4-feet long in the extended condition. The level can be manufactured in shorter or longer lengths, including a 4-foot retracted length extendible to 8-feet, and any intermediate length. The leaf springs 54 are preferably attached to guide member 8L and both leaf springs 54 urge slides 28A, 28B toward the guide member 8U. Alternatively, one of the leaf springs may be attached in channel 20U to urge one slide toward guide member 8L and the other leaf spring attached in channel 20L to urge the other slide toward guide member 8U. The leaf springs take up clearance between the slides 28 and the frame 2.

The web plate 12 is formed with an aperture in which two indicators, such as bubble vials 56 are mounted. One of the vials is oriented for testing a vertical surface and the other is oriented for testing a horizontal surface. The bubble vials 56 project from the web plate 12 into the channels 20 of the frame 2. Since the web plate 46 of the slide 28 is held away from the web plate 12 of the frame 2 by the flanges 48, the web plate 46 remains clear of the bubble vials 56 when the slide is inserted in the channel 20. Similarly, the web plates 40 are each formed with an aperture in which two indicators, such as bubble vials 58 are mounted. The bubble vials 58 project from the web plate 40 into the channels 42, 44 of the frame extender. Since the web plate 46 of the slide 28 is held away from the web plate 40 of the frame extender by the flanges 48, the web plate 46 of the slide 28 remains clear of the bubble vials 58. Moreover, when the level is compressed from its extended condition to its retracted condition, and the slide 28 of one rail enters the channel 44 of the other rail, the web plate 46 remains clear of the bubble vials 58 of the other rail. The bubble vials 58 are thereby protected from damage by impact with the slide.

The interaction of the components of the level as frame 2 and rails 4 are moved between the retracted and extended conditions is best seen in FIGS. 10 and 11, where leaf spring 54 is shown mounted to channel 20L, preferably by a central mount such as single rivet 72, or by other suitable means. Leaf spring 54 includes two wings 74, 76 extending left and right of mount 72, each wing having a convex shape, preferably formed by pre-bending wings 74, 76 at a contact line 78, 80, respectively. As best seen in FIG. 11, sliding surface 49L of slide 28 preferably contacts leaf spring 54 substantially only at contact lines 78, 80. Alternatively, other biasing means can be used. Leaf spring 54 preferably urges slide 28 upwardly with at least about 22-lbs of force. The convex shape of leaf spring 54 minimizes the amount of contact surface between spring 54 and slide 28 and also facilitates insertion of slide 28 into channel 20L during level assembly.

The biasing of slide 28 by spring 54 provides for a frictional sliding of slide 28 relative to frame 2 that is easily movable by a user, while at the same time substantially fixing the slide in place at any position relative to frame 2 by frictionally holding slide 28 in frame 2. Thus, a user can position the slide to any position between and including extended and retracted, use the level, and then set the level down in any orientation, and the frictional hold prevents the level's condition from changing despite gravity's acting on the level components.

The level is shown in the extended condition in FIG. 11 with slide 28 moved as far outwardly as possible because pin 29 is abutted against a stop, such as rubber or neoprene piece 82 installed, e.g., by gluing, in channel 20L. Alternatively other methods of limiting the outward movement of slide 28 may be used. During assembly, pin 29 is preferably not installed on slide 28, allowing insertion of the slide into the channel. Pin 29 is preferably installed after assembly.

Slide 28 is typically shorter than the distance between channels 20U and 20L. E.g., channels 20U and 20L may measure about 2.050-inches from sliding surface 21U to a corresponding surface 21L on channel 20L, while slide 28 may measure about 1.980-inches between sliding surfaces 49U and 49L. Leaf spring 54 takes up the difference in the heights of the slide and the inside of frame 2, positioning and urging slide 28 against upper sliding surface 21U. Thus, while flanges 16L of frame 2, and corresponding flanges 52L of frame extender 32 are preferably taller than flanges 16U and 52U, upper and lower rebates 60 of slide 28 are preferably identical in size, and slide 28 fits appropriately in channels 20U and 20L for controlled, slidable motion, because slide 28 is biased upwardly within the frame. A spacer, such as stainless steel bar 84 (FIGS. 5, 6, and 8) is preferably installed in frame extender 32 to position slide 28 within frame extender 32 in generally the same relative position as spring 54 positions slide 28 within frame 2. The web plates 12 and 46 are formed with openings which serve to reduce the weight of the level and facilitate gripping and handling of the level. The openings also provide viewing access to the bubble vials, so that regardless of the degree of extension of the level, the user can see at least one vial oriented for testing a vertical surface and one vial oriented for testing a horizontal surface.

The manner of use of the level, for testing a nominally vertical or nominally horizontal surface, or for marking segments of a horizontal or vertical line on a vertical surface, will be well understood by a person skilled in the art.

In use of the level illustrated in the drawings, for example in a confined space, the user extends the rails from the frame sufficiently to span the desired distance without interference with other structures, and the user can then determine whether a nominally horizontal (or vertical) surface is in fact horizontal (or vertical) or can mark a horizontal (or vertical) line on a vertical surface between two structures that would interfere with a longer level. Further, it is possible to manipulate the level into a confined space in its retracted condition and then extend it for use, e.g. in marking a vertical or horizontal line on a wall.

The construction of the rails is best seen in FIGS. 5, 6, and 8 where slide 28 is inserted into frame extender 32 so that the ends of each are generally flush. As described above, spacer 84 positions slide 28 in frame extender 32 to match the position of slide 28 in frame 2. Spacer 84 preferably includes a bend 86 that gives spacer 84 a convex shape to increase a frictional hold between slide 28 and frame extender 32. A shim, such as strip of UHMW tape 88 is preferably applied at entrance portions of upper and lower channels 42U and 42L of frame extender 32 to position slide 28 within frame extender 32. Slide 28 preferably bares a width and height relationship to frame extender 32 as that described above for slide 28 and frame 2.

Slide 28, frame extender 32, and spacer 84 preferably are assembled together by drilling a hole 90 longitudinally through slide 28, frame extender 32, and spacer 84. Hole 90, which is roughly centered on spacer 84, is then tapped, and the rail components are secured together, preferably by an Allen bolt 92 screwed into hole 90.

The construction and affixing of end cap 50 is best seen in FIGS. 8 and 9, where end cap 50 can be seen to include two lobes 94 that fit over each side of web plate 40 of frame extender 32. A fastener, such as screw 96 affixes end cap 50 to frame extender 32. End cap 50 is preferably formed of a plastic material, and provides a rounded, cushioned end to the level.

It will be appreciated that the invention is not restricted to the particular embodiment that has been described, and that variations may be made therein without departing from the scope of the invention as defined in the appended claims and equivalents thereof.

I claim:

1. A level adjustable between a retracted condition and an extended condition, the level comprising:
   a frame including a first guide surface and a guide member;
   a rail including a second guide surface and a slide, the rail mounted to the frame with the second guide surface coplanar with the first guide surface, and with the slide adjacent and slidable relative to the guide member between the retracted condition and the extended condition;
   an indicator mounted to one of the frame and the rail, the indicator readable by a user to determine if the guide surfaces are in either a horizontal or a vertical position;
   a biasing means coupled to the rail and the frame, the biasing means urging the slide to slide toward the guide member.

2. The level of claim 1 wherein the slide includes a sliding surface and the guide member includes a sliding surface, and the sliding surfaces contact one another and are urged against one another by the biasing means to increase the friction between the sliding surfaces and frictionally hold the rail and the frame in any position between the retracted and extended conditions.

3. The level of claim 1 wherein the slide includes a sliding surface and the guide member includes a sliding surface, and the sliding surfaces are in contact with one another, and wherein at least one of the sliding surfaces is treated to prevent sticking.

4. The level of claim 3 wherein the at least one of the sliding surfaces includes a coating.

5. The level of claim 4 wherein the coating includes polytetrafluoroethylene blended with a material selected from the group of epoxy, a polyester-epoxy hybrid, and polyester.

6. The level of claim 5 wherein the polytetrafluoroethylene is about 6% of the coating.

7. The level of claim 5 wherein the coating is about 5% to about 7% polytetrafluoroethylene.

8. The level of claim 1 wherein one of the rail and the frame includes a pin and the other of the rail and the frame includes a stop, the pin and the stop positioned to abut one another as the level reaches the extended condition.

9. The level of claim 1 further wherein the rail includes a frame extender that provides the second guide surface, and further wherein the slide is coupled to the frame extender by a fastener installed in a hole extending longitudinally into the slide and the frame extender.

10. The level of claim 1 further wherein the rail includes a frame extender coupled to the slide, the frame extender including a web plate, and further comprising an end cap coupled to the web plate.

11. The level of claim 1 wherein a second indicator mounted to another one of the frame and the rail, the second indicator readable by a user to determine if the guide surfaces are in either horizontal or a vertical position.

12. A level adjustable between a retracted condition and an extended condition, the level comprising:
    a frame including a first guide surface and a guide member having a sliding surface;
    a rail including a second guide surface and a slide having a sliding surface, the rail mounted to the frame with the second guide surface coplanar with the first guide surface, and with the sliding surfaces of the frame and the rail contacting one another and sliding relative to one another as the frame and rail are moved between the retracted and extended conditions, wherein at least one of the sliding surfaces is treated to prevent sticking; and
    an indicator mounted to one of the frame and the rail, the indicator readable by a user to determine if the guide surfaces are in either a horizontal or a vertical position; and
    further comprising a biasing means coupled to the rail and the frame, the biasing means urging the sliding surfaces to slide against one another to increase the friction between the sliding surfaces and frictionally hold the rail and the frame in any position between the retracted and extended conditions.

13. A level adjustable between a retracted condition and an extended condition, the level comprising:
    a frame including a first guide surface and an upper guide member and a lower guide member, the upper guide member defining a channel and including a sliding surface, the other guide member having a leaf spring mounted thereon;
    a rail including a second guide surface and a slide having an upper sliding surface and a lower sliding surface, the rail mounted to the frame with the second guide surface coplanar with the first guide surface, and the slide disposed at least partially in the channel, wherein one of the sliding surfaces of the rail contacts the sliding surface of the frame and the other sliding surface of the rail contacts the leaf spring, the slide moving relative to the guide members as the frame and rail are moved between the retracted and extended conditions; and
    an indicator mounted to one of the frame and the rail, the indicator readable by a user to determine if the guide surfaces are in a desired orientation.

14. The level of claim 13 wherein the upper guide member of the frame includes a flange and the lower guide member of the frame includes a flange, and further wherein the flange of the lower guide member is taller than the flange of the upper guide member.

15. The level of claim 13 further wherein the rail includes a frame extender that provides the second guide surface, and further wherein the slide is coupled to the frame extender by a fastener extending longitudinally into the slide and into the frame extender.

16. The level of claim 13 further wherein the rail includes a frame extender coupled to the slide, the frame extender including a web plate, and further comprising an end cap coupled to the web plate.

17. The level of claim 13 wherein the leaf spring biases the sliding surface of the rail against the sliding surface of the frame to frictionally hold the rail and the frame in any relative position between the retracted and extended conditions.

18. The level of claim 16 wherein the leaf spring includes two wings extending from a central mount.

19. The level of claim 18 wherein the wings of the leaf spring each include a contact line defined between two surfaces, further wherein the leaf spring contacts the sliding surface of the rail substantially only adjacent the contact lines.

20. The level of claim 13 wherein the leaf spring exerts at least about 22-lbs of force on the rail.

21. The level of claim 13 wherein the rail further includes a frame extender providing the first guide surface, the frame extender and the frame having generally matching cross-sections, further wherein the slide is coupled to the frame extender, and further comprising a spacer coupled between the frame extender and the slide, the spacer positioning the slide within the frame extender in generally the same relative position as the leaf spring positions the slide within the frame.

22. A level adjustable between a retracted condition and an extending condition, the level comprising:

a frame including a first guide member, a second guide member, and a web plate, the guide members each including an outer flange, wherein the guide members, flanges, and web plate defining a pair of channels;

a rail slidably mounted at least partially in the channels;

a shim coupled between the rail and the frame, the shim positioning the rail against the outer flanges of the guide members.

23. The level of claim 22 wherein the shim is a strip of tape adhering to one of the rail and the frame.

24. The level of claim 23 wherein the strip of tape comprises polyethylene.

25. The level of claim 22 wherein the rail is treated at a surface contacting the outer flange to prevent sticking.

26. The level of claim 25 wherein the rail includes a coating comprising about 5% to about 7% polytetrafluoroethylene blended with a material selected from the group of epoxy, polyester-epoxy hybrid, and polyester.

27. A level adjustable between a retracted condition and an extended condition, the level comprising:

a frame including a first guide surface and an upper guide member and a lower guide member, the upper guide member defining a channel and including a sliding surface, the lower guide member having a leaf spring mounted thereon;

a rail including a second guide surface and a slide having an upper sliding surface and a lower sliding surface, the rail mounted to the frame between the upper guide member and the leaf spring with the second guide surface coplanar with the first guide surface, and the slide disposed at least partially in the channel, wherein one of the sliding surfaces of the rail bears on the sliding surface of the frame and the other sliding surface of the rail bears on the leaf spring, the slide moving relative to the guide members as the frame and rail are moved between the retracted and extended conditions; and an indicator mounted to one of the frame and the rail the indicator readable by a user to determine if the guide surfaces are in a desired orientation.

28. The level of claim 27 wherein the leaf spring biases the sliding surface of the rail against the sliding surface of the frame to frictionally hold the rail and the frame in any relative position between the retracted and extended conditions.

29. The level of claim 27 wherein the leaf spring includes two wings extending from a central mount.

\* \* \* \* \*